(12) United States Patent
Fong et al.

(10) Patent No.: US 11,716,773 B2
(45) Date of Patent: Aug. 1, 2023

(54) ASSOCIATION BETWEEN DEVICES

(71) Applicant: Hewlett-Packard Development Company, L.P., Spring, TX (US)

(72) Inventors: Chee Keat Fong, Spring, TX (US); Valiuddin Ali, Palo Alto, CA (US)

(73) Assignee: Hewlett-Packard Development Company L.P., Spring, TX (US)

( * ) Notice: Subject to any disclaimer, the term of this patent is extended or adjusted under 35 U.S.C. 154(b) by 324 days.

(21) Appl. No.: 16/639,544

(22) PCT Filed: Aug. 18, 2017

(86) PCT No.: PCT/US2017/047619
§ 371 (c)(1),
(2) Date: Feb. 14, 2020

(87) PCT Pub. No.: WO2019/035845
PCT Pub. Date: Feb. 21, 2019

(65) Prior Publication Data
US 2020/0229248 A1 Jul. 16, 2020

(51) Int. Cl.
| H04B 7/00 | (2006.01) |
| H04W 76/11 | (2018.01) |
| G06F 7/58 | (2006.01) |
| G06K 19/06 | (2006.01) |
| H04W 84/18 | (2009.01) |

(52) U.S. Cl.
CPC ............... *H04W 76/11* (2018.02); *G06F 7/58* (2013.01); *G06K 19/06037* (2013.01); *H04W 84/18* (2013.01)

(58) Field of Classification Search
CPC ....... H04W 84/18; H04W 4/80; H04W 76/10; H04W 76/11; G06F 7/58; G06K 19/06037
See application file for complete search history.

(56) References Cited

U.S. PATENT DOCUMENTS

| 8,626,144 | B2 | 1/2014 | Talty et al. |
| 9,338,638 | B1 | 5/2016 | Palin et al. |
| 9,503,969 | B1 | 11/2016 | Zakaria |
| 2012/0142271 | A1 | 6/2012 | Zhodzishsky et al. |
| 2013/0167208 | A1 | 6/2013 | Shi |
| 2014/0302849 | A1 | 10/2014 | Palin |

(Continued)

FOREIGN PATENT DOCUMENTS

| CN | 102545968 A | 7/2012 |
| CN | 105025433 A | 11/2015 |

(Continued)

OTHER PUBLICATIONS

Schiavi, E, "Using Bluetooth LE GAP/GATT Services without Pairing Manually First", Apr. 14, 2016.

*Primary Examiner* — Nhan T Le
(74) *Attorney, Agent, or Firm* — Knobbe, Martens, Olson & Bear, LLP

(57) ABSTRACT

In an example implementation according to aspects of the present disclosure, a method may include randomly generating a value, illustrating a code containing the value, and scanning for a device advertising a service that is to use the value. Upon discovering the device advertising the service that is to use the value, the method may include associating with the device by connecting to the service and exchanging information with the device.

15 Claims, 3 Drawing Sheets

(56) References Cited

U.S. PATENT DOCUMENTS

| | | | |
|---|---|---|---|
| 2014/0342670 A1* | 11/2014 | Kang | H04L 69/14 |
| | | | 455/67.11 |
| 2015/0195008 A1 | 7/2015 | Johnson et al. | |
| 2016/0042342 A1* | 2/2016 | Proctor, Jr. | G06Q 20/381 |
| | | | 705/44 |
| 2017/0019873 A1 | 1/2017 | Britt | |
| 2017/0134227 A1* | 5/2017 | Song | H04L 41/0806 |
| 2017/0287018 A1* | 10/2017 | Narasimhan | G06F 21/32 |

FOREIGN PATENT DOCUMENTS

| | | |
|---|---|---|
| CN | 105578398 A | 5/2016 |
| CN | 106211205 A | 12/2016 |
| CN | 106604212 A | 4/2017 |
| WO | WO-2016037012 A1 | 3/2016 |

* cited by examiner

ASSOCIATION BETWEEN DEVICES

BACKGROUND

Before two devices communicate with each other via a wireless communication scheme, such as Bluetooth communication technology, the devices may be synchronized and paired with each other so that data transmission and sharing or a corresponding operation can be executed. As the focus on power consumption by computing devices, such as smartphones, continue to increase, in an effort to extend battery life, wireless technologies continue to advance. For example, Bluetooth Low Energy (BLE), compared to Classic Bluetooth, provides reduced power consumption while maintaining a similar communication range, as the BLE protocol transmits small packets compared to Classic Bluetooth. As a result, the power efficiency of devices utilizing BLE have the ability to provide longer battery life.

DETAILED DESCRIPTION

Examples disclosed herein provide the ability for devices to associate with each other. As an example, BLE devices may associate with each other for exchanging information, without having to go through a pairing process. As a result, reliability issues involved with pairing BLE devices may be avoided. As will be further described, the association or relationship established between the BLE devices allows for subsequent mutual identification and communication, for example, when the BLE devices come within communication range of each other at other times after the initial association.

Figure 1:
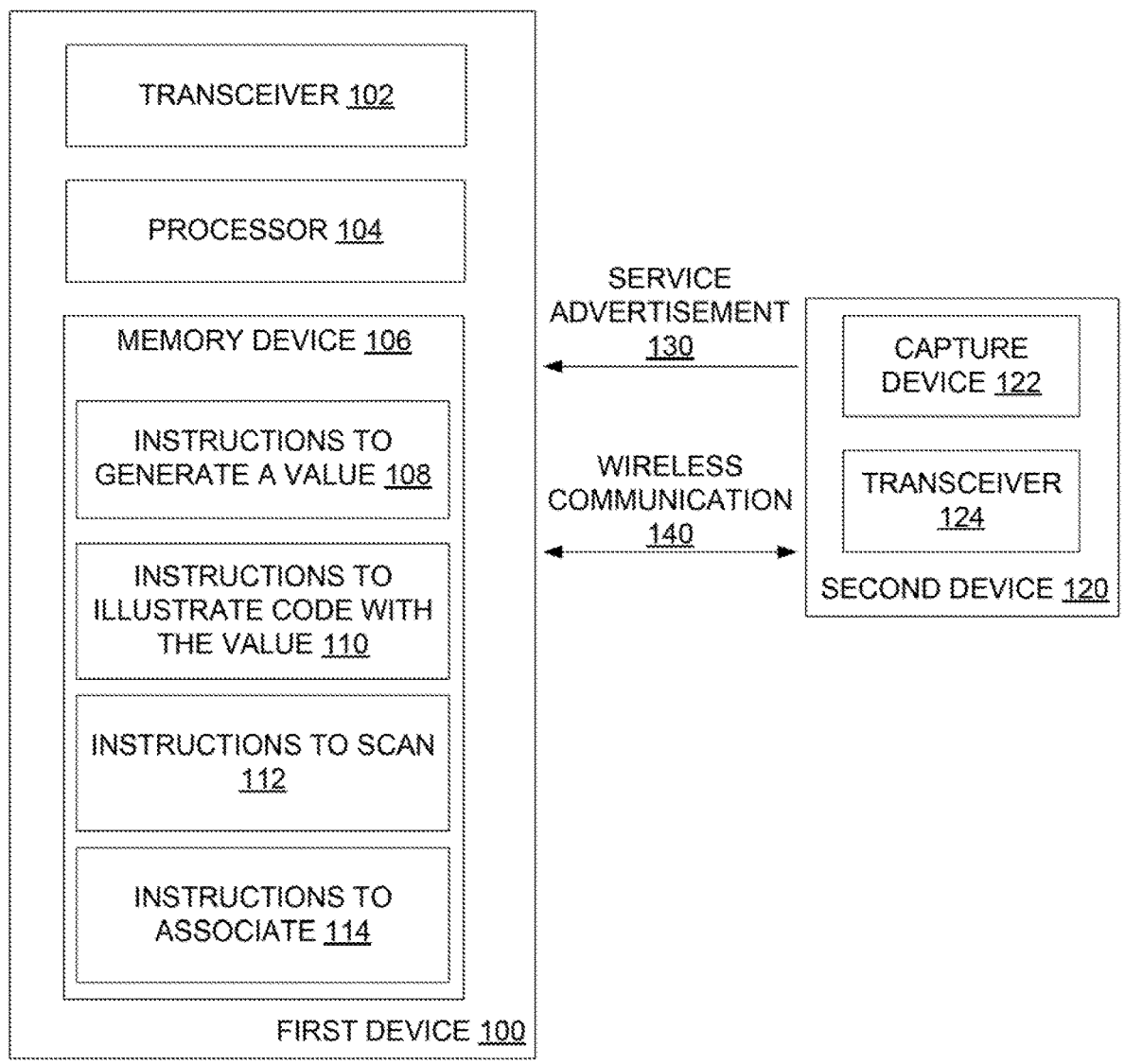
FIG. 1 illustrates a first device and a second device that may associate with each other for wireless communication, according to an example.

With reference to the figures, FIG. 1 illustrates a first device 100 and a second device 120 that may associate with each other for wireless communication, according to an example. As will be further described, association between the first device 100 and second device 120 may be initiated by a user that uses a capture device 122 (e.g., camera) of the second device 120 to capture a code illustrated by the first device 100. As an example, the code contains a value randomly generated by the first device 100, that makes association between the first device 100 and second device 120 unique, for subsequent mutual identification and communication, for example, when the devices come within communication range of each other at other times after the initial association. With regards to BLE devices, the first device 100 may correspond to a central device and the second device 120 may correspond to a peripheral device. As will be further described, randomly generated values by the first device 100 allow for the first device 100 to have unique associations with various peripheral devices.

The first device 100 depicts a processor 104 and a memory device 106 and, as an example of the first device 100 performing its operations, the memory device 106 may include instructions 108-114 that are executable by the processor 104. Thus, memory device 106 can be said to store program instructions that, when executed by processor 104, implement the components of the first device 100. The executable program instructions stored in the memory device 106 include, as an example, instructions to generate a value (108), instructions to illustrate a code with the value (110), instructions to scan (112), and instructions to associate (114).

Instructions to generate a value (108) represent program instructions that when executed by the processor 104 cause the first device 100 to randomly generate a value. With regards to BLE, a Generic Attributes (GATT) profile defines the way BLE devices transfer data back and forth, using concepts called Services and Characteristics. As an example, Services and Characteristics, and related data, are stored in a lookup table using identifiers (IDs) for each entry in the table. Each service may distinguish itself from other services by means of a unique numeric ID. In addition, IDs may be used to create custom GATT services, as will be further described. The custom created GATT services may be used by BLE devices to associate and exchange information with each other, without having to go through a pairing process. For example, the value randomly generated by the first device 100 corresponds to an ID that may be used by the second device 120 to create a unique association between the first device 100 and second device 120.

Instructions to illustrate a code with the value (110) represent program instructions that when executed by the processor 104 cause the first device 100 to illustrate a code containing the ID, which is the randomly generated value. The code may be illustrated on a display of the first device 100 or a display associated with the first device 100. As an example, the code may be a quick response (OR) code illustrated on the display, where the QR code contains the ID. As an example, additional IDs may be included in the QR code, each ID corresponding to a GATT service that the second device 120 will be creating. For example, once the QR code is illustrated by the first device 100, capture device 122 of the second device 120, such as a camera, may be used to capture the QR code. Capturing of the QR code by the capture device 122 may be initiated using an application on the second device 120. After scanning the QR code, the second device 120 creates the custom GATT services matching the IDs that it scanned from the QR code. Upon using the IDs from the QR code to create the GATT services, the second device advertises the created GATT services (e.g., service advertisement 130), for example, via transceiver 124.

Instructions to scan (112) represent program instructions that when executed by the processor 104 cause the first device 100 to scan for a device advertising a service using the randomly generated value, which corresponds to the ID described above. As an example, while the first device 100 is showing the QR code, it will also continuously scan, via transceiver 102, for BLE devices and the GATT services they advertise. The moment the first device 100 sees a device advertising GATT services with IDs that match the ones in the QR code, it would have discovered the device that scanned the QR code (e.g., second device 120), due to the unique ID randomly generated by the first device 100 for the GATT service to be created. As a result, although other BLE devices may be advertising other GATT services in proximity of the first device 100, the Ds used by these devices to create these other GATT services may not match the Ds from the QR code.

Instructions to associate (114) represent program instructions that when executed by the processor 104 cause the first device 100, upon discovering the device advertising the service that is to use the randomly generated value, to associate with the device by connecting to the service and exchanging information with the device (e.g., second device 120). For example, once the first device 100 sees the second device 120 advertising GATT services with IDs that match the ones in the QR code, for example, via service advertisement 130, the first device 100 can then proceed to connect to the GATT services of the second device 120 and exchange registration information, via wireless communication 140. Examples of registration information that may be exchanged include, but are not limited to, public key pairs, registration IDs, or any other artifact that could be used for security or further identification.

Once this registration process is complete, the first device 1010 and second device 120 may store the IDs and other artifacts exchanged during this registration process. For subsequent communications, the second device 120 would then continue to advertise the GATT services using the same IDs. For example, if the first device 100 and second device 120 moves out of Bluetooth range and then back again, the first device 100 would be able to easily locate and reconnect to the second device 120 again using the GATT service IDs, even though the name and/or Bluetooth ID of the second device 120 could have changed. As the IDs are random values generated during registration between the first device 100 and second device 120, a unique association may be established between the first device 100 and second device 120.

Upon the first device 100 associating with the second device 120, where the second device 120 creates custom GATT services from the IDs found in the QR code illustrated by the first device 100, the first device 100 may randomly generate another ID when illustrating the QR code, in order for the first device 100 to make itself available to create a unique association with other BLE peripheral devices.

Memory device 106 represents generally any number of memory components capable of storing instructions that can be executed by processor 104. Memory device 106 is non-transitory in the sense that it does not encompass a transitory signal but instead is made up of at least one memory component configured to store the relevant instructions. As a result, the memory device 106 may be a non-transitory computer-readable storage medium. Memory device 106 may be implemented in a single device or distributed across devices. Likewise, processor 104 represents any number of processors capable of executing instructions stored by memory device 106. Processor 104 may be integrated in a single device or distributed across devices. Further, memory device 106 may be fully or partially integrated in the same device as processor 104, or it may be separate but accessible to that device and processor 104.

In one example, the program instructions 108-114 can be part of an installation package that when installed can be executed by processor 104 to implement the components of the first device 100. In this case, memory device 106 may be a portable medium such as a CD, DVD, or flash drive or a memory maintained by a server from which the installation package can be downloaded and installed. In another example, the program instructions may be part of an application or applications already installed. Here, memory device 106 can include integrated memory such as a hard drive, solid state drive, or the like.

Figure 2:
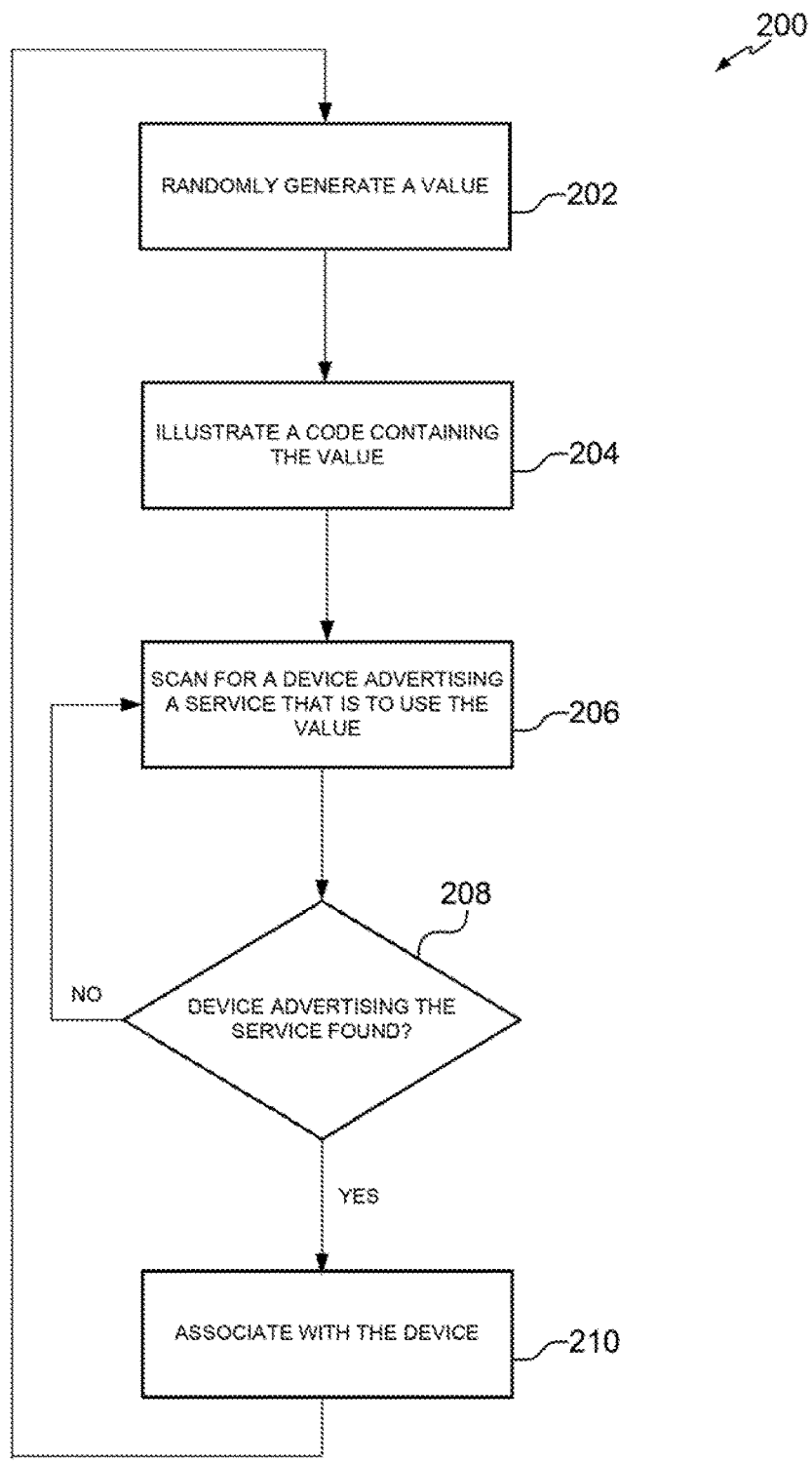
FIG. 2 illustrates a method at a central device for associating with peripheral devices, according to an example.

FIG. 2 illustrates a method 200 at a central device for associating with peripheral devices, according to an example. In discussing FIG. 2, reference may be made to the first device 100 illustrated in FIG. 1. Such reference is made to provide contextual examples and not to limit the manner in which method 200 depicted by FIG. 2 may be implemented.

Method 200 begins at 202, where the central device randomly generates a value. With regards to BLE, a GATT profile defines the way BLE devices transfer data back and forth, using concepts called Services and Characteristics. As described above, the value corresponds to an ID that may be used to create a custom GATT service. The custom created GATT services may be used by BLE devices to associate and exchange information with each other, without having to go through a pairing process. Referring back to FIG. 1, the value randomly generated by the first device 100 corresponds to an ID that may be used by the second device 120 to create a unique association between the first device 100 and second device 120.

At 204, the central device illustrates a code containing the ID, which is the randomly generated value. The code may be illustrated on a display of the device or a display associated with the device. As an example, the code may be a QR code illustrated on the display, where the QR code contains the ID. Once the QR code is illustrated by the device, a capture device of a peripheral device (e.g., second device 120) may be used to capture the QR code. Capturing of the QR code by the capture device may be initiated using an application on the peripheral device. After scanning the QR code, the peripheral device creates the custom GATT service matching the ID that it scanned from the QR code. Upon using the ID from the QR code to create the GATT service, the peripheral device advertises the created GATT service.

At 206, the central device scans for a peripheral device advertising a service using the randomly generated value, which corresponds to the ID described above. As an example, while the central device is showing the QR code, it will also continuously scan for BLE peripheral devices and the GATT services they advertise. At 208, when the central device sees a peripheral device advertising GATT services with IDs that match the ones in the QR code, it would have discovered the peripheral device that scanned the QR code, due to the unique ID randomly generated by the central device for the GATT service to be created.

At 210, the central device associates with the peripheral device by connecting to the service and exchanging information with the peripheral device. For example, once the central device sees the peripheral device advertising GATT services with IDs that match the ones in the QR code, the central device can then proceed to connect to the GATT services of the peripheral device and exchange registration information. Examples of registration information that may be exchanged include, but are not limited to, public key pairs, registration Ds, or any other artifact that could be used for security or further identification.

Figure 3:
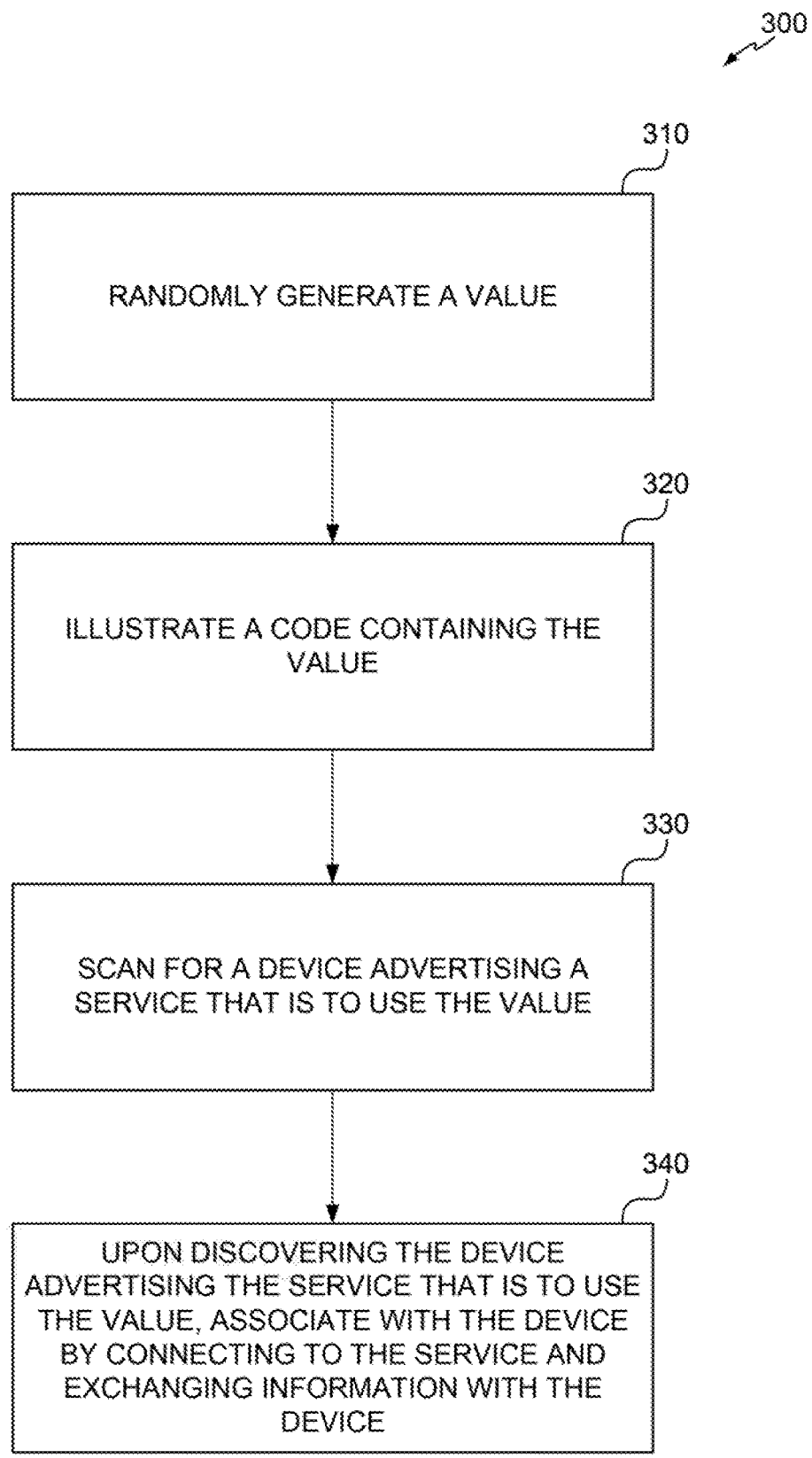
FIG. 3 is a flow diagram in accordance example of the present disclosure.

FIG. 3 is a flow diagram 300 of steps taken by a device to implement a method for devices to associate with each other, according to an example. In discussing FIG. 3, reference may be made to the first device 100 illustrated in FIG. 1. Such reference is made to provide contextual examples and not to limit the manner in which the method depicted by FIG. 3 may be implemented.

At 310, the device randomly generates a value. As described above, the value corresponds to an ID that may be used by a peripheral device for creating a custom GATT service. The custom created GATT service may be used by BLE devices to associate and exchange information with each other, without having to go through a pairing process. At 320, the device illustrates a code containing the value, such as a QR code. Upon a peripheral device capturing the QR code, for example, via a camera, the peripheral device may proceed in creating the custom GATT service, based on the randomly generated ID found in the QR code.

At 330, the device scans for a peripheral device advertising a service that is using the value. The moment the device sees a peripheral device advertising GATT services with IDs that match the ones in the QR code, it would have discovered the peripheral device that scanned the QR code, due to the unique ID randomly generated by the device for the GATT service to be created. As a result, although other BLE peripheral devices may be advertising other GATT services in proximity of the device, the IDs used by these devices to create these other GATT services may not match the IDs from the QR code.

At 340, upon discovering the peripheral device advertising the service that is to use the value, the device associates with the peripheral device by connecting to the service and exchanging information with the peripheral device. After the initial association, both the device and peripheral device stores the value and exchanged information for subsequent associations. In order to create unique associations with other peripheral devices, the device randomly generates another value for including in the code that is illustrated. Upon another peripheral capturing the code with the other randomly generated value, another unique association may be created, as described above.

Although the flow diagram of FIG. 3 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but to be accorded the widest scope consistent with the principles and novel features disclosed herein.

What is claimed is:

1. A method comprising:
   generating, by a first device, a value to be utilized as an identifier (ID) for an information exchange service by which the first device can communicate;
   illustrating, by a display of the first device, a code containing the value;
   scanning, by the first device, for a second device advertising the information exchange service, wherein the second device has captured the code illustrated by the display of the first device and generated the information exchange service with the value contained in the code;
   discovering, by the first device, the second device advertising the information exchange service generated with the value; and
   in response to the first device discovering the second device advertising the information exchange service generated with the value,
       creating, by the first device, a unique association between the first device and the second device, wherein creating the unique association comprises connecting, by the first device, to the information exchange service and exchanging information with the second device utilizing the information exchange service.

2. The method of claim 1, comprising storing the value and the exchanged information for subsequent associations with the second device.

3. The method of claim 1, comprising:
   upon associating with the second device, randomly generating, by the first device, a second value different from the value;
   illustrating, by the first device, a second code containing the second value, wherein the second code is different from the code; and
   scanning for a third device advertising a second information exchange service that is to use the second value, wherein the second information exchange service is different from the information exchange service.

4. The method of claim 1, wherein illustrating the code comprises illustrating a quick response (QR) code on a display of the first device, wherein the QR code is to contain the value.

5. The method of claim 1, wherein the second device is to advertise the information exchange service upon capturing the illustrated code containing the value.

6. The method of claim 5, wherein the second device is to create the information exchange service from the value contained in the captured code.

7. The method of claim 6, wherein the value corresponds to the identifier (ID) and the information exchange service corresponds to a Generic Attributes (GATT) service.

8. A first device comprising:
   a display;
   a transceiver; and
   a processor to:
   generate a value to be utilized as an identifier (ID) for an information exchange service by which the first device can communicate;
   illustrate a code containing the value on the display;
   scan, by the first device, for a second device advertising the information exchange service, wherein the second device has captured the code illustrated by the display of the first device and generated the information exchange service with the value contained in the code;
   discovering, by the first device, the second device advertising the information exchange service generated with the value; and
   in response to the first device discovering the second device advertising the information exchange service generated with the value, creating, by the first device, a unique association between the first device and the second device, wherein creating the unique association comprises connecting, by the first device, to the information exchange service and exchanging information with the second device using the transceiver and the information exchange service; and store the value and the exchanged information for subsequent associations with the second device.

9. The first device of claim 8, wherein the processor is to:

upon associating with the second device, randomly generate a second value different from the value;

illustrate a second code containing the second value, wherein the second code is different from the code; and scan for a third device advertising a second information exchange service that is to use the second value, wherein the second information exchange service is different from the information exchange service.

10. The first device of claim 8, wherein the processor to illustrate the code comprises illustrating a quick response (QR) code on the display, wherein the QR code is to contain the value.

11. The first device of claim 8, wherein the second device is to advertise the information exchange service upon capturing the illustrated code containing the value.

12. The first device of claim 11, wherein the second device is to create the information exchange service from the value contained in the captured code.

13. A non-transitory computer-readable storage medium comprising program instructions which, when executed by a processor, to cause the processor to:

generate a value to be utilized as an identifier (ID) for an information exchange service by which a first device can communicate;

illustrate a quick response (QR) code containing the value, wherein the QR codes is illustrated on a display;

scan, by the first device, for a second device advertising the information exchange service, wherein the information exchange service is generated by the second device utilizing the value captured from the code illustrated by the display of the first device and generated the information exchange service to associate and exchange data using the information exchange service;

discovering, by the first device, the second device advertising the information exchange service generated with the value; and in response to the first device discovering the second device advertising the information exchange service using the value, create, by the first device, a unique association between the first device and the second device wherein creating the unique association comprises connecting, by the first device, to the information exchange service and exchanging information with the second device through the information exchange service, wherein the unique association is defined by the value captured from the code.

14. The non-transitory computer-readable storage medium of claim 13, comprising program instructions to cause the processor to store the value and the exchanged information for subsequent associations with the device.

15. The non-transitory computer-readable storage medium of claim 13, wherein the value corresponds to the identifier (ID) and the information exchange service corresponds to a Generic Attributes (GATT) service.

* * * * *